(12) United States Patent
Geelen et al.

(10) Patent No.: US 9,019,302 B2
(45) Date of Patent: Apr. 28, 2015

(54) GENERATING A DISPLAY IMAGE

(75) Inventors: Pieter Geelen, Amsterdam (NL); David Martens, Utrecht (NL)

(73) Assignee: TomTom International B.V., Amsterdam (NL)

( * ) Notice: Subject to any disclaimer, the term of this patent is extended or adjusted under 35 U.S.C. 154(b) by 589 days.

(21) Appl. No.: 12/736,674

(22) PCT Filed: May 29, 2008

(86) PCT No.: PCT/EP2008/004594
§ 371 (c)(1),
(2), (4) Date: Jan. 31, 2011

(87) PCT Pub. No.: WO2009/143871
PCT Pub. Date: Dec. 3, 2009

(65) Prior Publication Data
US 2011/0141138 A1 Jun. 16, 2011

(51) Int. Cl.
*G09G 5/00* (2006.01)
*G01C 21/36* (2006.01)

(52) U.S. Cl.
CPC ...................................... *G01C 21/36* (2013.01)

(58) Field of Classification Search
USPC .......................................... 345/619; 701/455
See application file for complete search history.

(56) References Cited

U.S. PATENT DOCUMENTS

| | | | | |
|---|---|---|---|---|
| 5,556,282 | A * | 9/1996 | Middlebrook | 434/178 |
| 5,790,121 | A * | 8/1998 | Sklar et al. | 715/853 |
| 7,990,394 | B2 * | 8/2011 | Vincent et al. | 345/629 |
| 2004/0001114 | A1 * | 1/2004 | Fuchs et al. | 345/855 |
| 2005/0104881 | A1 | 5/2005 | Yoshida et al. | |
| 2005/0288836 | A1 * | 12/2005 | Glass et al. | 701/29 |
| 2006/0178826 | A1 | 8/2006 | Gomi | |
| 2006/0287815 | A1 * | 12/2006 | Gluck | 701/208 |
| 2007/0038692 | A1 * | 2/2007 | Pierce et al. | 708/422 |
| 2008/0059055 | A1 | 3/2008 | Geelen et al. | |
| 2008/0235631 | A1 * | 9/2008 | Fuchs et al. | 715/853 |
| 2008/0244459 | A1 * | 10/2008 | Fuchs et al. | 715/855 |
| 2008/0291201 | A1 * | 11/2008 | Lafon | 345/427 |

FOREIGN PATENT DOCUMENTS

| | | |
|---|---|---|
| CN | 1617173 A | 5/2005 |
| CN | 1949272 A | 4/2007 |
| EP | 1 531 322 | 5/2005 |
| TW | 200817933 A | 4/2008 |

OTHER PUBLICATIONS

International Search Report.
International Preliminary Report on Patentability dated Nov. 30, 2010.

* cited by examiner

*Primary Examiner* — M Good Johnson

(57) ABSTRACT

A method, computer program and apparatus are disclosed for generating a display image for a navigation device, wherein the display image includes a map view for display on the navigation device and the map view includes a two dimensional plan view. At least one embodiment of the method includes identifying a plurality of map objects from a digital map for display in a display image on a navigation device; determining whether any of the identified map objects include one or more non-visible features that would not be visible to a user of the navigation device at ground level; generating an adapted set of map objects that does not include any of the non-visible features; and generating, from the adapted set of map objects, a simplified display image for display on the navigation device, wherein the simplified display image does not include any of the non-visible features.

15 Claims, 8 Drawing Sheets

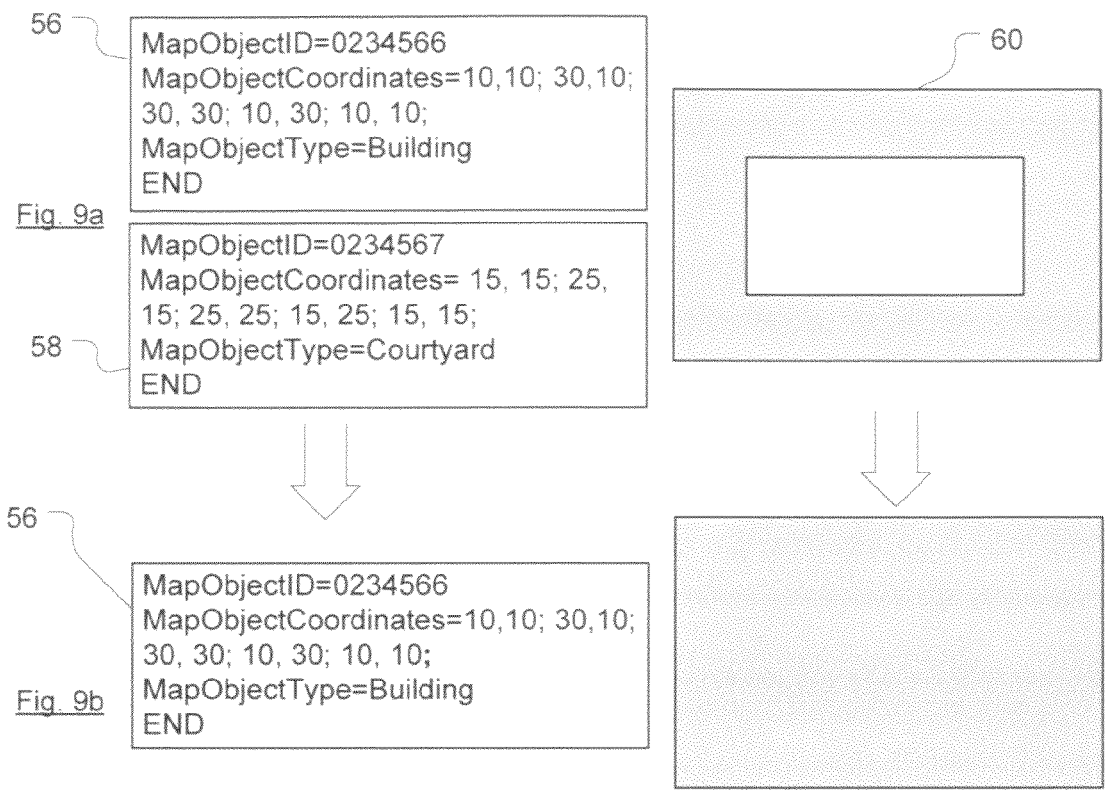
Fig. 9a
Fig. 9b
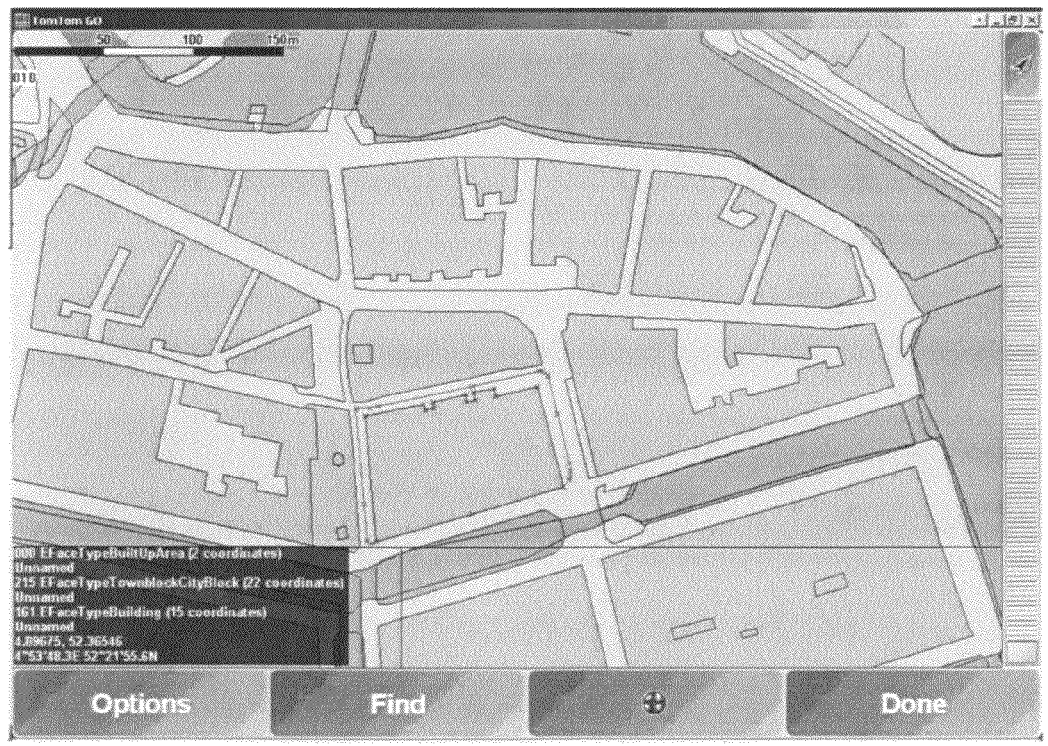
Fig. 10

GENERATING A DISPLAY IMAGE

FIELD OF THE INVENTION

This invention relates to an apparatus and method for generating a display image, for example a display image for a navigation device. The invention is especially, although not exclusively, suitable for portable navigation devices (so-called PNDs).

BACKGROUND TO THE INVENTION

Typically, a navigation device (be that an in-vehicle navigation device (i.e. a navigation device built into a vehicle and which cannot be removed from that vehicle); a PND such as a TomTom® Go 720 or similar; or a mobile telephone, personal digital assistant (PDA) or computer (e.g. a PC) executing navigation software) is configured to display an image that includes a map view generated from a digital map. The map view may be superposed with route information depicting a navigation route, and whilst this route information may be pre-recorded, it is more typically the result of a route-planning algorithm executed by the navigation device using suitable software. The navigation device may also include or interface with a position determining system (such as Global Positioning System (GPS)) for determining the current real-time position of the navigation device, and for dynamically adjusting the map view in accordance with the determined current position.

A popular type of map view is a two-dimensional-based map view that includes information in two-dimensions at ground level. For example, roads and buildings are represented by the shape of their footprints on the ground. Such two-dimensional information may be viewed as a plan (i.e. looking generally vertically downwardly on the map, in the same manner as a traditional paper map), or in artificial perspective as if viewing a traditional flat paper map from a perspective angle. However, in either case, the map view is generally "flat" in the sense that the information displayed is only two-dimensional ground level information, and references hereafter to a two-dimensional plan view should be construed to include both of these types of map view.

Particularly in the context of in-vehicle use, it is generally desirable to provide a highly intuitive navigation display that (i) provides the driver with current navigation information, and (ii) provides an indication of the future route, so that the driver can drive and position the vehicle appropriately.

It has also been previously proposed to provide other information to the driver that could potentially be of use. For example, it has previously been proposed to display points of interest (such as banks, petrol stations or public facilities) that are on or close to the route, street names for roads on or close to the route, and icons representing the location of speed limit enforcement cameras that are on the chosen route.

Whilst the provision of these additional items of information can often be of use to the driver, it is important that the driver is not provided with so much information that the route becomes difficult to follow or the driver is distracted by the amount of information displayed.

One simple way to avoid the problem of inadvertently overburdening the driver with information would be to provide this additional information only when the driver requests it, for example by touching the screen of the PND. However such an arrangement would require the driver to take at least one hand off the wheel of the vehicle to operate the PND. Whilst a driver should only do this whilst the vehicle is stationary some drivers will doubtless choose to attempt to operate the PND whilst moving, with potentially adverse consequences.

Clearly there is a fine balance to be drawn between providing the driver with information that might be of use and not overburdening the driver with information to such an extent that the driver's attention is distracted from safely operating the vehicle in which the PND is provided. The present invention has been devised with the aim of addressing these contradictory issues.

SUMMARY OF THE INVENTION

To this end, a presently preferred embodiment of the present invention provides a technique for generating a display image for a navigation device, wherein the display image includes a map view for display on the navigation device and the map view comprises a two dimensional plan view, the technique comprising: identifying a plurality of map objects from a digital map for display in a display image on a navigation device; determining whether any of said identified map objects include one or more non-visible features that would not be visible to a user of the navigation device at ground level; generating an adapted set of map objects from which said non-visible features have been removed; and generating, from said adapted set of map objects, a simplified display image for display on the navigation device, wherein said simplified display does not include any of said non-visible features.

This technique may be defined as a method, or an apparatus implementing the technique, or a computer program which implements the technique when executed.

By employing this technique it is possible to simplify the map view provided to the user of the device (without losing any route critical information), and as the map view is simplified additional information can be superposed on the map view without greatly increasing the complexity of the display. As explained above, the advantage of providing a less complex display is that the driver's attention is less likely to be diverted from driving the vehicle. Other advantages of this technique are that the resultant display is significantly more attractive than the overly complex displays of the type previously proposed, and as the display is significantly simpler it can more quickly be drawn than more complex displays. This last advantage is particularly apparent when the navigation functionality is embodied in a mobile telephone, for example, where the available system memory may be more limited that a larger device, and in which relatively complex display images may take a relatively large amount of time to construct and display.

In one embodiment, each said map object defines a feature of said digital map (as opposed to one or more features that together define a particular item of said digital map (such as a building for example)) for display in said display image The display map may include a plurality of different types of features, and each said map object may include an indication of the type of feature that that object relates to.

Preferably at least one of said features is a non-visible feature, and said step of generating an adapted set of map objects comprises the steps of identifying which of said map objects relate to a non-visible feature and selecting map objects other than said identified map objects for inclusion in said adapted set of map objects.

Alternatively (or additionally) at least one of said features is a non-visible feature, and said step of generating an adapted set of map objects comprises the steps of identifying which of said map objects do not relate to a non-visible feature and selecting those map objects for inclusion in said adapted set of map objects.

In another embodiment each said map object comprises a set of coordinate data points that together define a polygon.

In this embodiment, said determining step may comprise the steps of identifying an outermost boundary defined by at least part of the set of coordinate data points, determining whether said set includes any further coordinate data points within said boundary, and determining that said map object includes one or more non-visible features if said set should be determined to include any further coordinate data points within said boundary.

The step of generating an adapted set of map objects may comprise, for each said map object that is determined to include one or more non-visible features, the step of discarding all coordinate data points within said boundary to thereby provide an adapted map object for inclusion in said adapted set of map objects.

The adapted set of map objects may comprise said adapted map objects and any map objects that are determined, in said determining step, not to include any non-visible features.

In another embodiment each said map object comprises at least one constituent part that includes a plurality of data points defining a polygon.

In this embodiment said determining step may comprises determining whether said map object includes a plurality of parts that each includes a plurality of coordinate data points, and identifying any map objects that are determined to have a plurality of constituent parts to be a map object that includes at least one non-visible feature.

The step of generating an adapted set of map objects may comprise, for each said map object that is determined to include one or more non-visible features, the step of discarding any constituent parts other than a first part that defines an outermost boundary of said map object to thereby provide an adapted map object for inclusion in said adapted set of map objects.

Each said map object may relate to a building in said digital map and may define one or more features of said building.

In one arrangement said non-visible feature comprises a courtyard (e.g. an internal space that is entirely within the boundary of a building).

Other features and advantages of the invention will become apparent from the following description of preferred embodiments. While features believed to be of significance have been identified above and in the appended claims, the Applicant claims protection for any novel feature or idea described herein and/or illustrated in the drawings, whether or not emphasis has been placed thereon.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 9a and 9b are illustrative representations of further map objects and corresponding images for display in a display image;

FIG. 10 is a screenshot, similar to that of FIG. 4, to which the techniques of the present invention have been applied;

DETAILED DESCRIPTION OF PREFERRED EMBODIMENTS

Preferred embodiments of the present invention are described hereafter with particular reference to a PND that is configured to display a two-dimensional plan view of a digital map on which route information is superposed. It should be noted, however, that the arrangement hereafter described is merely illustrative and not intended to limit the scope of the present invention. For example, the teachings of the present invention could be equally implemented in an arrangement where a route is not displayed, such as a so-called "free driving" mode where the PND displays a map of the local area in which it is located without also displaying a route to a selected destination. The following description will also make particular reference to building map objects, but it should be noted that the teachings of the present invention may be more broadly applied to any type of map object.

Figure 1:
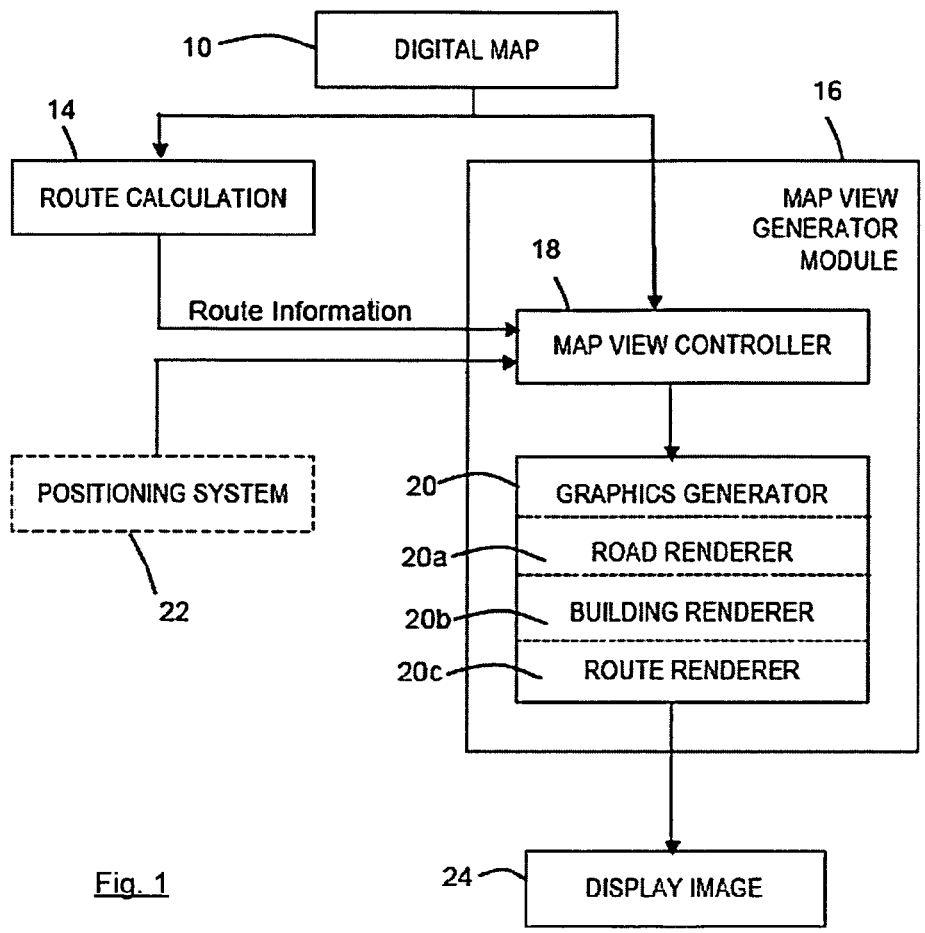
FIG. 1 is a schematic illustration showing information flow for generating a map view in a first embodiment.

FIG. 1 depicts schematically information flow used in a first embodiment, for processing information from a digital map 10, to generate a display image 24 including a map view and (in this illustrative example) superposed route information within the map view. It will be appreciated that FIG. 1 is not intended to represent a limiting architecture for implementing the invention. Instead, it is merely an illustrative representation of information flow between various processing stages. In general terms, the digital map 10 stores information, such as co-ordinate points (e.g. longitude & latitude), representing map objects such as roads and buildings, and these map objects are defined in the map by an indication of the map object type (e.g. road, building) and one or more coordinate points. Buildings or other objects can then be rendered in a display image by retrieving the coordinate points for that object, joining those points to create a boundary and then applying a graphic (e.g. a shading, colour or pattern) that is appropriate for that object type within the boundary to indicate the presence and form of the map object in the display image. As will be appreciated, an advantage of adopting such a mechanism for representing buildings and other objects is that the amount of data required to define the object is relatively small and as a consequence the map objects can be stored in a highly compressed form.

Information from the digital map 10 is supplied to a route calculation module 14 and to a map view generator module 16. The route-calculation module 14 is configured to plan a navigation route between a geographical start position and a geographical end position, one or both of which are selected by a user. The user may also provide additional route criteria, such as passing through one or more intermediate locations selectable by the user, or for using certain types of road or other transportation routes. The route-calculation module 14 provides the calculated route information to the map view generation module 16 for superposing the route information in the map view for display. The map view generation module 16 typically comprises sub-modules including, by way of example, a map view controller 18, and a graphics generator 20 that is responsive to the controller 18. The map view controller 18 manages a map view, by controlling which information is retrieved from the digital map 10, how the information is to be displayed in the map view, and how the route information is to be superposed in the map view. The map-view controller module 16 also dynamically controls the position of a location "field of view" (e.g. the portion of the map displayed in the map view). For example, the location field of view may depend on the current real-time position of a user as may be determined by an optional position determining module 22, for example, a GPS or other satellite/wireless signal based positioning system. Alternatively, the location field of view may be based on a location selected by the user, or on a location determined via a dead-reckoning system or equivalent. The graphics generator 20 includes one or more graphics engines for generating, or composing, the display image 24, pixel-by-pixel, on the basis of the map view information managed by the controller 18. The graphics engines may include, or execute commands to implement, a road renderer 20*a*, a building renderer 20*b*, and a route information renderer 20*c* for superposing the route information in the map view, as well as other custom graphics commands or engines.

Figure 2A:
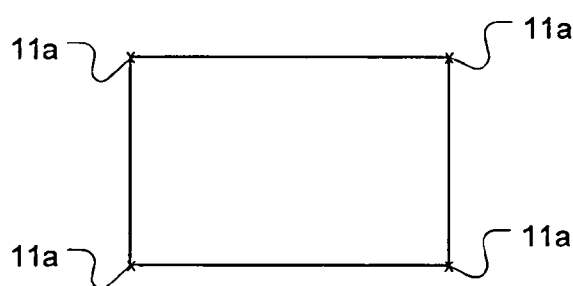
FIGS. 2a, 2b and 2c are different schematic representations of building map objects.
Figure 2B:
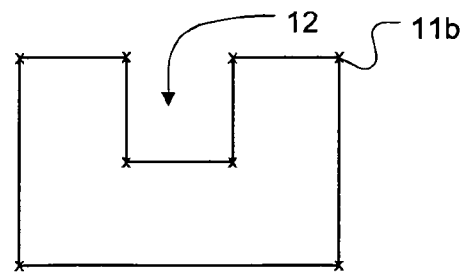
Figure 2C:
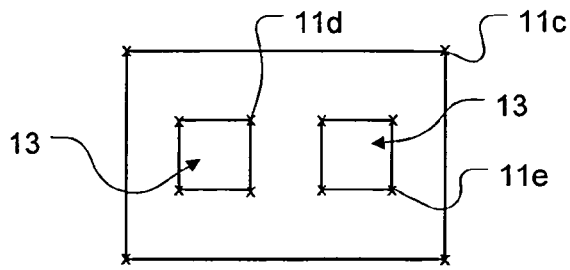

FIGS. 2*a*, 2*b* and 2*c* are illustrative examples of map objects that are each in the form of a building 12. The map objects each consist of a plurality of points that together define the shape of the building's footprint on the ground. In FIG. 2*a*, the map object comprises a sequence of connected points 11*a* that define a closed shape in the form of a rectangle. FIG. 2*b* illustrates another form of building where the map object comprises a sequence of connected points 11*b* that define a closed shape that is generally in the form of a C, and corresponds to the footprint of a building that has an open courtyard 12. FIG. 2*c* illustrates another form of building where the map object comprises a sequence of connected points 11*c* that forms a closed shape (in this instance a rectangle) which corresponds to the external boundary of the footprint of a building, and further sequences of connected portions 11*d*, 11*e* that each form a closed shape (in this instance a square) which corresponds to the footprint of an internal courtyard 13 that is entirely within the external boundary 11*c* of the building.

The internal courtyard 13 is an illustrative example of a non-visible feature of a map object. By non-visible we mean a feature of a map object (e.g. a building) that will not be visible to a user of a navigation device (e.g. a PND) who is at ground level and is looking at the real object (e.g. a building) that is represented in the display image of the device by the map object with the non-visible feature.

Figure 3:
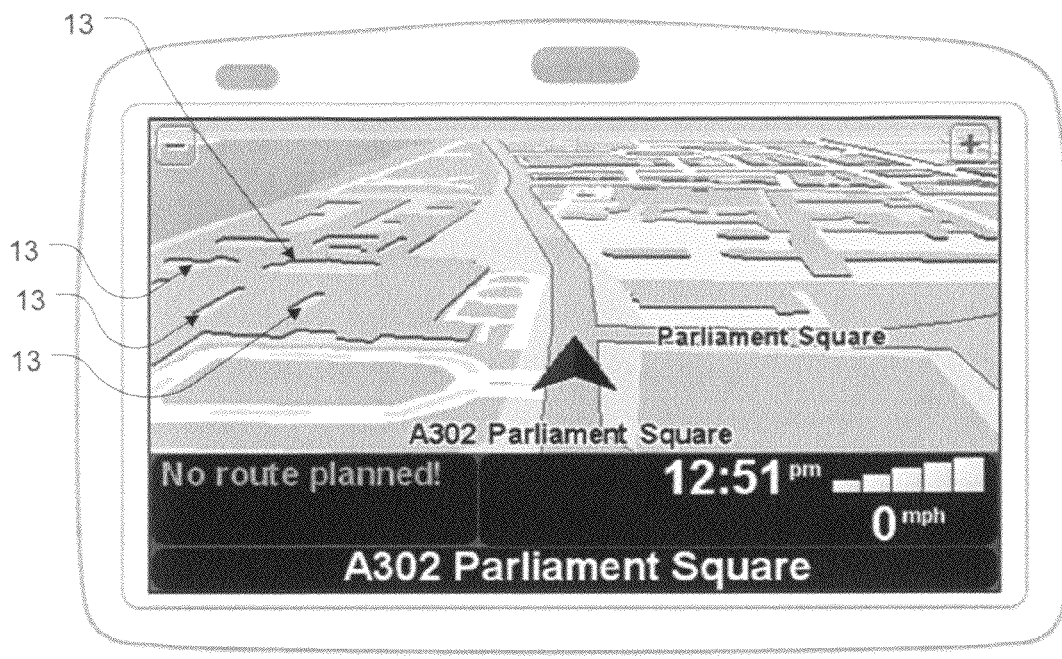
FIG. 3 is an illustrative screenshot of a display image of a portable navigation device.
Figure 4:
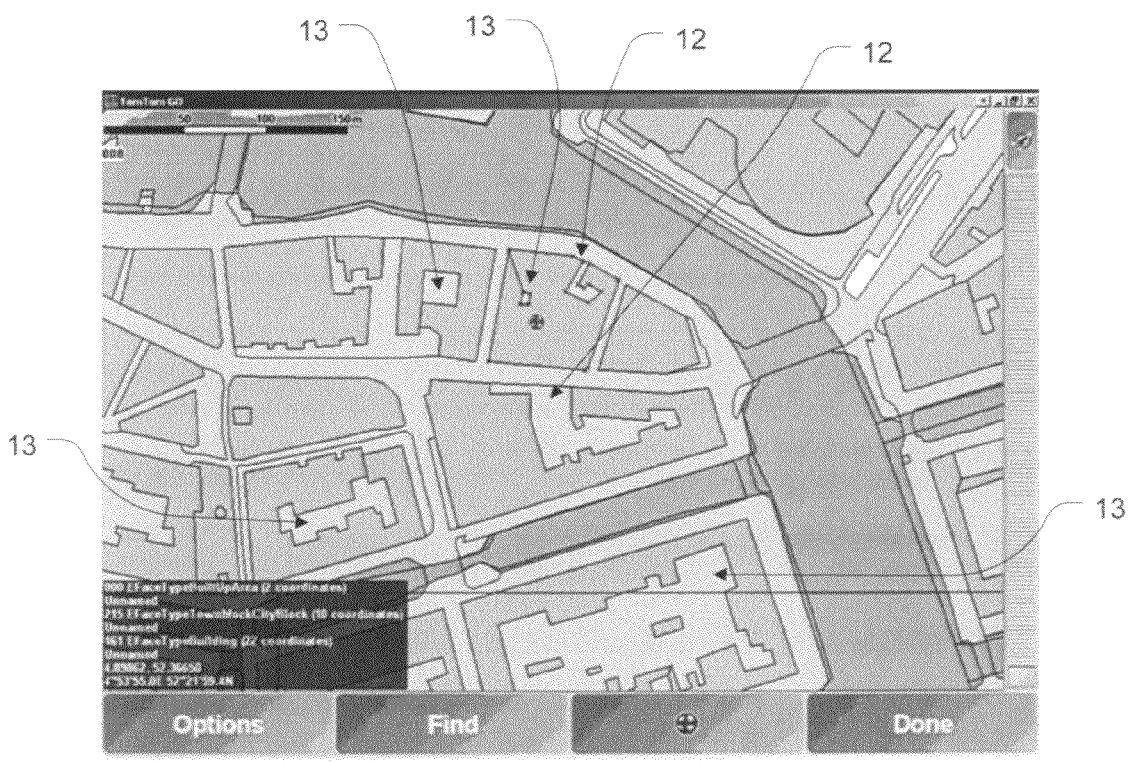
FIG. 4 is another illustrative screenshot of a display image.

FIGS. 3 and 4 are screenshots of two different map views in which various different types of map object are displayed. FIG. 3 is an illustrative representation of the display of a TomTom® Go 720 on which there is displayed (in artificial perspective) a map view of Parliament Square in London, United Kingdom where a large number of internal courtyards 13 in The Palace of Westminster (aka the Houses of Parliament) can be seen. FIG. 4 is an illustrative map view generated by TomTom® Go software that displays a two-dimensional plan view of Rembrandtsplein in Amsterdam, Holland where several buildings with internal courtyards 13 and one building with an open courtyard 12 can clearly be seen. As will be appreciated, the internal courtyards 13 of The Palace of Westminster and those of the buildings in Rembrandtsplein are non-visible features that would not be visible to a user of a navigation device that is at the locations corresponding to the map views displayed and looking at the real buildings corresponding to those that are represented in the display image of that device.

Whilst the faithful display of map objects, such as buildings for example, provides the user with an extremely accurate view of an area of the digital map, complex building shapes can clutter the display image and be something of a distraction—particularly if the user should be in heavy traffic or be trying to navigate a route in unfamiliar surroundings.

It is also the case that as at least some of this detailed map object information comprises non-visible features—like internal courtyards in buildings, for example—the display of these features does not enhance the amount of useful information being provided to the user of the device. In actual fact, if the user has turned off the display of other information (such as speed cameras or points of interest) to simplify the display, then these non-visible features may be displayed at the expense of displaying other information items that could actually be of use to the user of the device.

Figure 5:
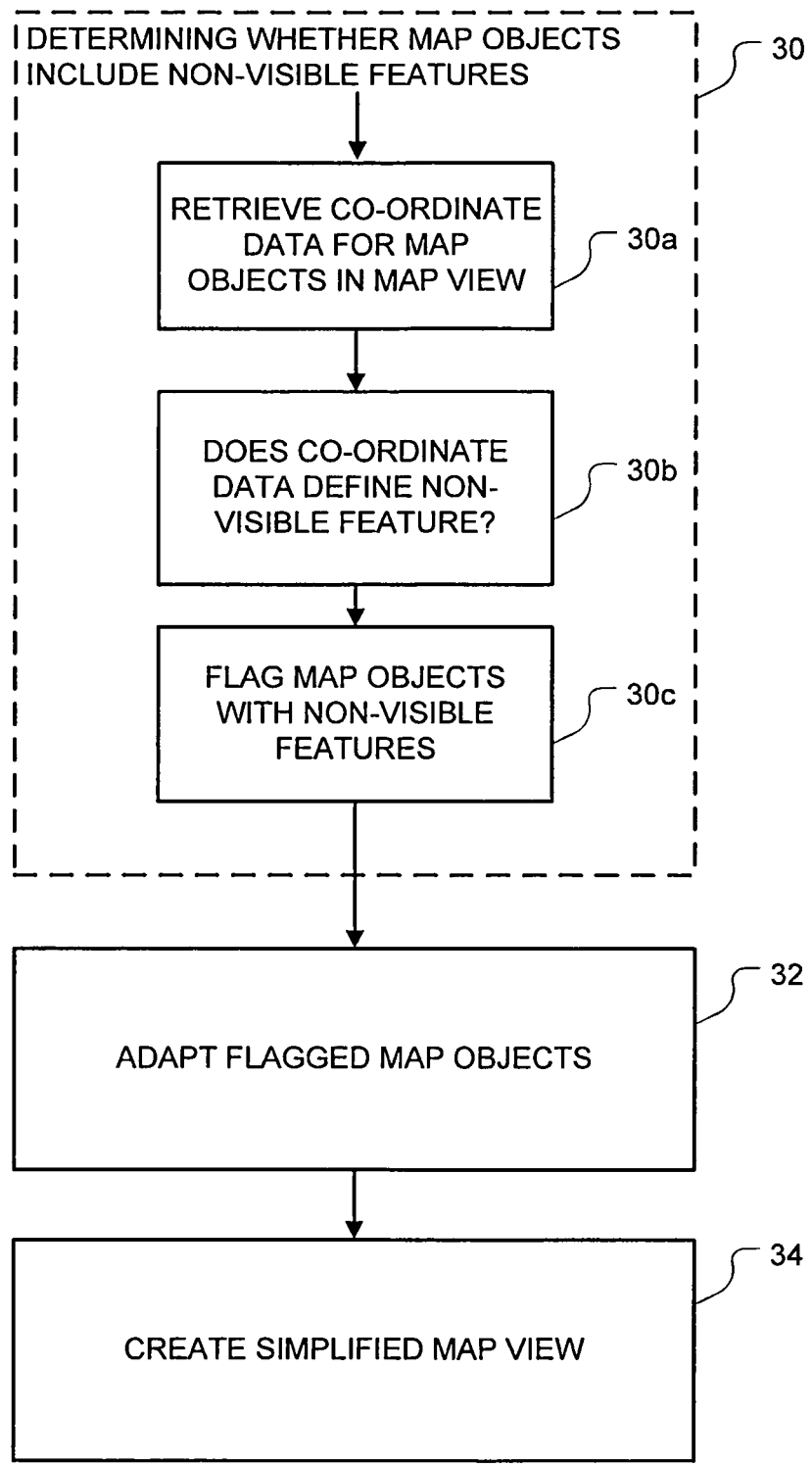
FIG. 5 is a schematic illustration of a technique according to a first embodiment of the present invention.
Figure 8:
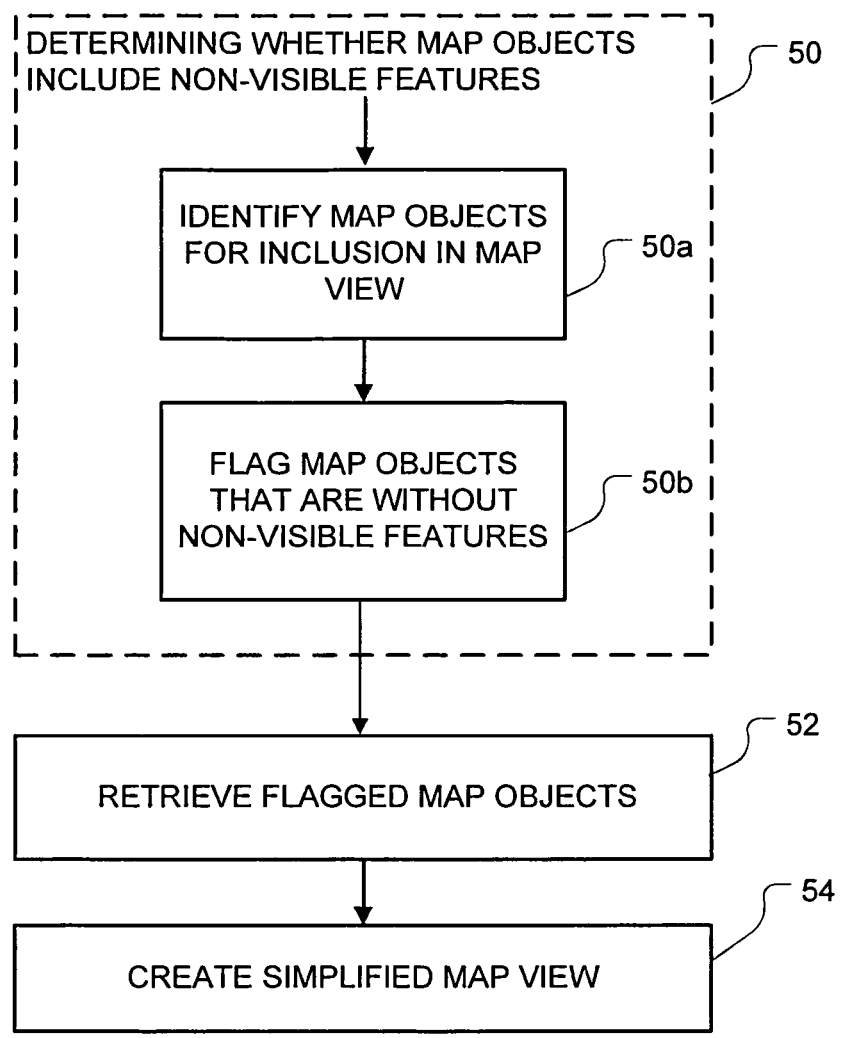
FIG. 8 is a schematic illustration of a technique according to a second embodiment of the present invention.

Referring to FIGS. 5 and 8, the embodiments of the present invention address this drawback by implementing a technique for managing the generation of a two-dimensional plan view by generally: (i) determining (stage 30; 50) whether map objects for display in the display image include one or more non-visible features, (ii) generating (stage 32; 52) an adapted set of map objects from which said non-visible features have been removed, and (iii) generating (stage 34; 54), from said adapted set of map objects, a simplified display image for display on the navigation device, wherein said simplified display does not include any of said non-visible features.

In one embodiment that is depicted schematically in FIG. 3, stage 30 of determining whether a map object comprises any non-visual features is divided into three sub-stages 30*a*, 30*b* and 30*c*. In stage 30*a* the coordinate data points that define a given map object that is to be included within the map view are retrieved from the digital map. In stage 30*b*, a determination is made as to whether the coordinate data for that retrieved map object defines a map object that includes any non-visible features. If the map object does include any non-visible features, the object is then flagged (or otherwise marked) in stage 30*c* for further processing. This process is repeated for all map objects that are determined to fall within the map view that is to be displayed on the display of the device.

In stage 32, those map objects which were flagged in stage 30*c* are further processed by removing from display the non-visible features from each map object, for example by removing from display the map object coordinate points which are associated with non-visible features. The adapted map objects (i.e. the map objects with non-visible features removed) are then temporarily stored for later retrieval.

In stage 34, a simplified map view is created that comprises any adapted map objects generated in stage 32 and any map objects that were originally determined in stage 30*b* not to include any non-visible features. The simplified map view is then rendered for display as a display image on the device.

As will be appreciated, these stages need not necessarily be completed in this order. For example, the technique could—instead of initially considering all the map objects and flagging those that require further processing—consider each of the map objects in turn and immediately process those that include non-visible features before moving to consider the next map object. As a further alternative, the technique could render each map object individually, and then combine the rendered map objects to provide the display image for display on the device.

The particular way that this technique is implemented will depend to a lesser or greater extent on the way that map objects are stored in the digital map.

Figure 6A:
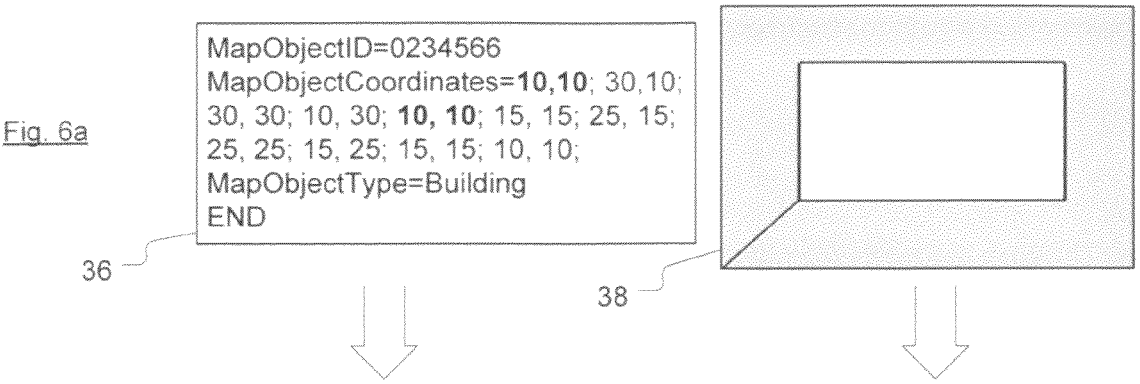
FIGS. 6a and 6b are illustrative representations of map objects and corresponding images for display in a display image.

One way of implementing this embodiment is depicted schematically in FIG. 6a, and with reference thereto there is shown an illustrative a map object 36 that is stored in the digital map and an illustration 38 of the map object as it would appear in a map view prepared otherwise than in accordance with the present technique. The map object comprises a unique ID number (MapObjectID), a series of co-ordinates (MapObjectCoordinates) defining a series of co-ordinate points (which would typically be longitudes and latitudes, but are shown here as simple co-ordinates for convenience) separated from one another by semi-colons, and an indication (MapObjectType) of what type of object the map object represents.

Such an illustrative map object would be rendered, for example by the graphics controller 20, by drawing lines in an anti-clockwise direction from an initial start point. In this instance the graphics controller would draw a line from an initial start co-ordinate point (which in this instance is 10, 10 (shown emboldened for clarity)) to the next co-ordinate point 30, 10; from this initial start coordinate point to the next point 30, 30; from point 30, 30 to point 10, 30; from point 10, 30 back to initial start point 10, 10; from initial start point 10,10 to point 15, 15; from point 15, 15 to point 25, 15; from point 25, 15 to point 25, 25; from point 25, 25 to point 15, 25; from point 15, 25 to point 15, 15, and from thence to initial start point 10,10. The graphics controller would then infill the resulting polygon with a graphic (for example a shading, pattern or colour) that is associated with the type of map object, in this instance a building, as defined by the variable MapObjectType.

To implement the technique of the present invention, the map object 36 co-ordinate data (defined by variable set: MapObjectCoordinates) retrieved from the digital map 10 is reviewed to first determine the initial start point (in this instance 10, 10). The coordinate data is then analysed to find the next mention of this initial start point. Next a determination is made as to whether this next mention of the initial start point is followed by any further co-ordinate data points, and if any further data points are present the map object is flagged for further processing (stage 30c).

Figure 6B:
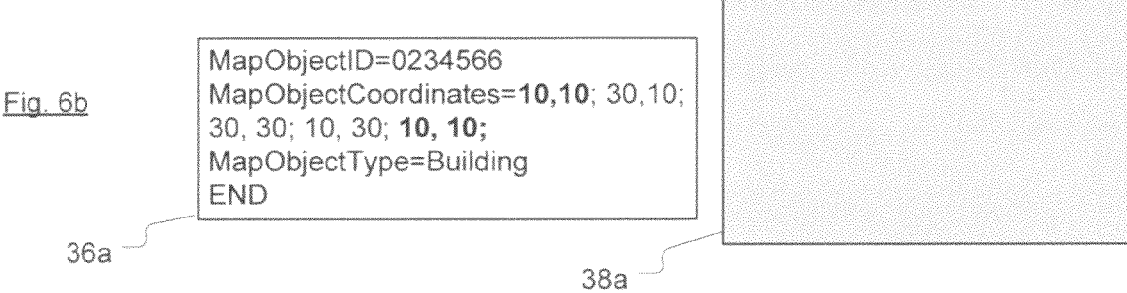

In stage 30c, the map object is further processed to remove any coordinate data points after the next mention of the initial start point (in this instance 10, 10). The resulting adapted map object 36a is shown, alongside an illustration 38a of the adapted map object as it would appear in the map view, in FIG. 6b.

In effect this implementation assumes that a line drawn between the first mention of the initial start point and the next mention of the initial start point defines a boundary for the map object, and that any data points subsequent to the next mention of the initial start point will be inside of that boundary and hence are for internal non-visible features of the map object that, in accordance with the technique of the present invention, will not be displayed.

Figure 7A:
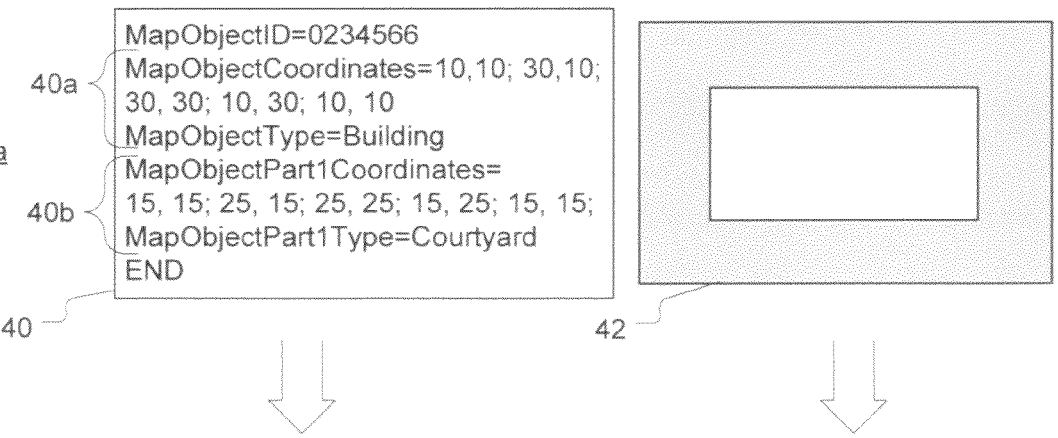
FIGS. 7a and 7b are illustrative representations of further map objects and corresponding images for display in a display image.

Another way of implementing this embodiment is depicted schematically in FIG. 7a, and with reference thereto there is shown an illustrative a map object 40 that is stored in the digital map and an illustration 42 of the map object as it would appear in a map view prepared otherwise than in accordance with the present technique.

In this illustration the map object comprises a unique ID number (MapObjectID), a first part 40a defined by variables MapObjectCoordinates and MapObjectType which relates to the external boundary of the map object, and further parts defined by variables MapObjectPartxCoordinates and MapObjectPartxType (where x is a number denoting a feature of the object). In this particular instance the map object 40 includes only a second part 40b defined by variables MapObjectPart1Coordinates and MapObjectPart1Type. If the map object had included two courtyards, for example, then a second set of variables MapObjectPart2Coordinates and MapObjectPart2Type would be defined.

Such an illustrative map object would be rendered, for example by the graphics controller 20, by drawing lines in an anti-clockwise direction from an initial start point. In this instance the graphics controller would draw a line from an initial start co-ordinate point (which in this instance is 10, 10) of variable set MapObjectCoordinates in the first part 40a of the map object to the next co-ordinate point 30, 10; from this coordinate point to the next point 30, 30; from point 30, 30 to point 10, 30; and from point 10, 30 back to initial start point 10, 10. The graphics controller would then infill the resulting polygon with a graphic (for example a shading, pattern or colour) that is associated with the type of map object, in this instance a building, as defined by the variable MapObjectType.

The graphics controller would then draw a line from an initial start co-ordinate point (which in this instance is 15, 15) of variable set MapObjectPart1Coordinates in the second part 40b to point 25, 15; from point 25, 15 to point 25, 25; from point 25, 25 to point 15, 25; and from thence to initial start point 15; 15. The graphics controller would then infill the resulting polygon with a graphic (for example a shading, pattern or colour) that is associated with the type of map object, in this instance a courtyard, as defined by the variable MapObjectPart1Type.

In this implementation, the map object 40 is reviewed to determine whether it includes a second part 40b defined by variables MapObjectPart1Coordinates and MapObjectPart1Type. If a second part is present the map object is flagged for further processing (stage 30c).

Figure 7B:
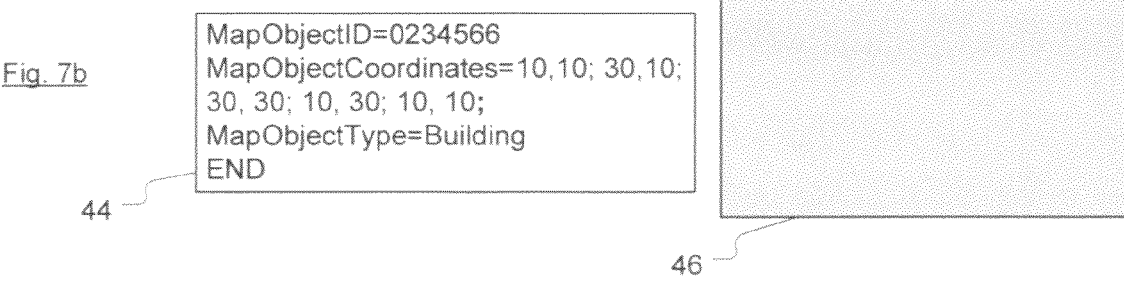

In stage 30c, the map object is further processed to remove all variables associated with the second part (and if present any variables associated with third and subsequent parts). The resulting adapted map object 44 is shown, alongside an illustration 46 of the adapted map object as it would appear in the map view, in FIG. 7b.

In effect this implementation assumes that the first part 40a of the map object defines a boundary, and that any subsequent parts (e.g. part 40b) will be inside of that boundary and hence are for internal non-visible features of the map object that, in accordance with the technique of the present invention, will not be displayed.

In another embodiment that is depicted schematically in FIG. 8, stage 50 of determining whether map objects for inclusion in the display image comprise any non-visual features is divided into two sub-stages 50a and 50b. In stage 50a the map objects that are at least partly located within the map view are identified. In stage 50b, a determination is made as to whether any of these map objects include non-visible features. If any given map object does not include any non-visible features, the object is then flagged (or otherwise marked) in stage 50b. This process is repeated for all map objects that are determined to fall at least partly within the map view that is to be displayed on the display of the device and when completed provides an adapted set of map objects (as compared with the original set of map objects identified in stage 50*a*) from which non-visible features have been removed.

In stage 52, the adapted set of map objects (i.e. those map objects which were flagged in stage 50*b*, namely those map objects that are without non-visible features) is retrieved from the digital map, and in stage 54 a simplified map view is created that comprises only the map objects retrieved in stage 52. The simplified map view is then rendered for display as a display image on the device.

FIGS. 9*a* and 9*b* illustrate this embodiment of the invention in more detail. In FIG. 9*a* there are shown two illustrative map objects 56 and 58, and to the right of the map objects an illustration 60 of the map objects as they would appear in a map view prepared otherwise than in accordance with the present technique.

In this illustration each map object 56, 58 relates to a feature of the map view and comprises a unique ID number (MapObjectID), a series of co-ordinates (MapObjectCoordinates) defining a series of co-ordinate points (which would typically be longitudes and latitudes, but are shown here as simple co-ordinates for convenience) separated from one another by semi-colons, and an indication (MapObjectType) of what type of feature each map object represents.

To ensure that the "courtyard" MapObjectType is visible (and not, for example, hidden behind another object), the map objects retrieved for a given map view may be processed by map object types (e.g. buildings are processed first, followed by courtyards), or certain map object types may be configured so that they are displayed on top of any other map object types (e.g. courtyard map object types are displayed on top of building object types).

If we assume that the former arrangement is employed in this instance, map object 56 would first be rendered, for example by the graphics controller 20, by drawing lines in an anti-clockwise direction from an initial start point. In this instance the graphics controller would draw a line from an initial start co-ordinate point (which in this instance is 10, 10) of variable set MapObjectCoordinates in map object 56 to the next co-ordinate point 30, 10; from this coordinate point to the next point 30, 30; from point 30, 30 to point 10, 30; and from point 10, 30 back to initial start point 10, 10. The graphics controller would then infill the resulting polygon with a graphic (for example a shading, pattern or colour) that is associated with the type of map object, in this instance a building, as defined by the variable MapObjectType.

The graphics controller would then render map object 58 on top of map object 56 by drawing a line from an initial start co-ordinate point (which in this instance is 15, 15) of variable set MapObjectCoordinates in map object 58 to point 25, 15; from point 25, 15 to point 25, 25; from point 25, 25 to point 15, 25; and from thence to initial start point 15, 15. The graphics controller would then infill the resulting polygon with a graphic (for example a shading, pattern or colour) that is associated with the type of map object, in this instance a courtyard, as defined by the variable MapObjectType.

In this embodiment, to implement the technique of the present invention map objects of the digital map that are determined to be within the display image are reviewed to determine whether they are, as defined by variable MapObjectType, of a chosen map object type (in this instance, a courtyard) that comprises a non-visible feature which is not to be displayed. Any map objects that are determined not to be of the chosen map object type are flagged for further processing (stage 50*b*).

In stage 50*b*, those flagged map objects that are determined to be devoid of non-visible features are retrieved from the digital map, and in stage 54 a simplified map view is created from the retrieved map objects.

In this arrangement each feature of an illustrated map view is defined by a map object, and this implementation of the present technique effectively removes from consideration (for subsequent rendering) all map objects that relate to features of a particular type, in this instance a courtyard. As depicted in FIG. 9*b*, implementation of this technique would effectively remove from consideration map object 58, leaving only map object 56.

A functionally equivalent arrangement could be provided by flagging map objects that include a chosen map object type (for example a map object type that comprises a non-visible feature) that is not to be displayed, and then retrieving from the digital map all map objects within the image view other than the flagged map objects.

FIG. 10 is another view of the map image depicted in FIG. 4 to which the above techniques have been applied. As is clearly visible by comparing FIGS. 4 and 10, the internal courtyards 13 of the buildings have been removed from the map image displayed in FIG. 10. The overall effect of this is that the display image of FIG. 10 is greatly simplified as compared to the map image displayed in FIG. 4, and as a result is less likely to be a distraction to the driver.

The above technique is typically performed by the map view controller 18 (FIG. 1), as the map view controller 18 can assess map objects before the map objects are placed and rendered by the graphics generator 20. It will be appreciated, however, that this functionality may be provided by alternative or additional components.

Figure 11:
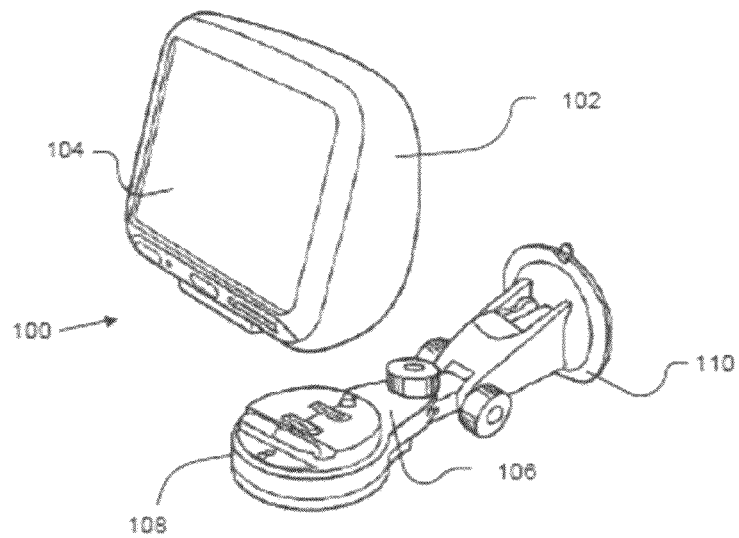
FIG. 11 is a schematic perspective view of a navigation device.
Figure 12:
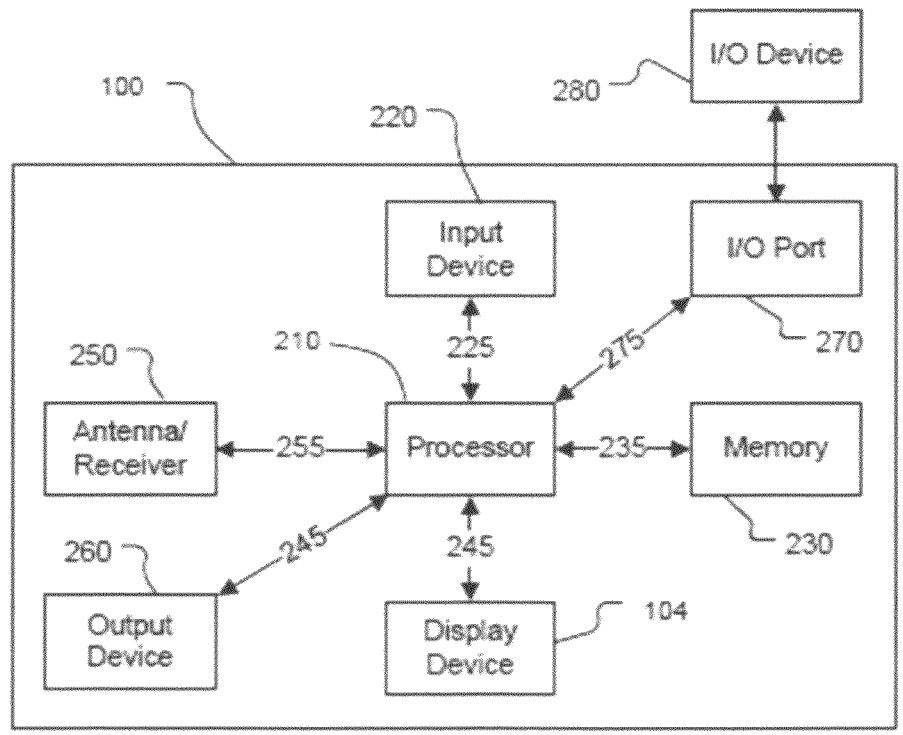
FIG. 12 is a schematic block diagram showing the navigation apparatus hardware.
Figure 13:
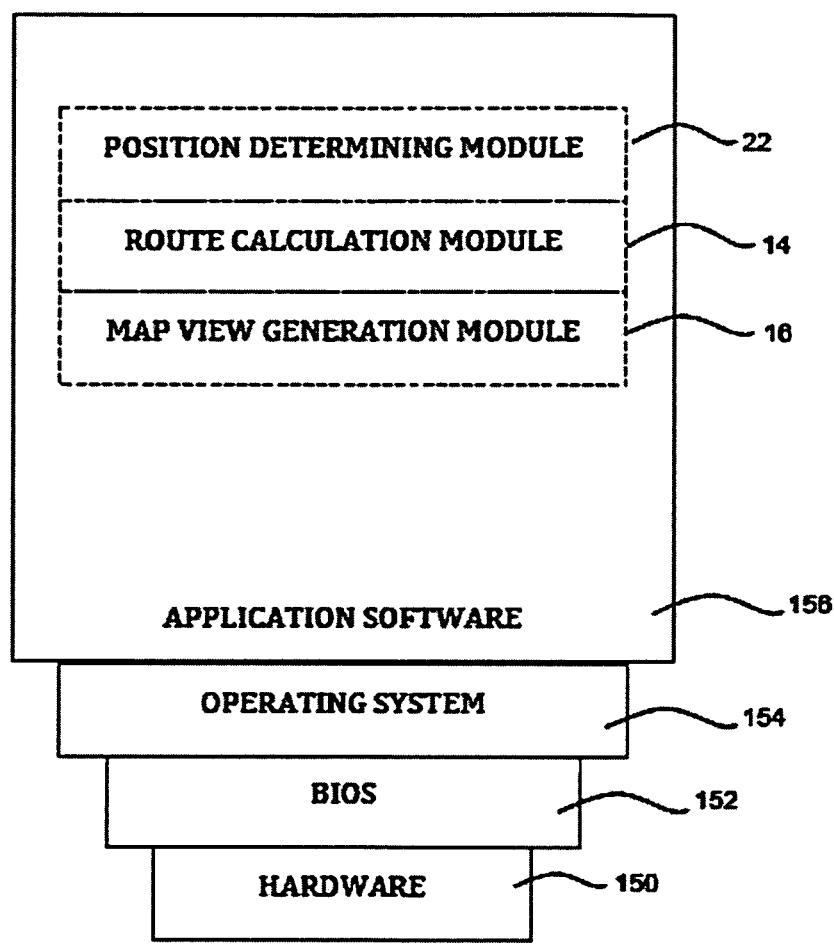
FIG. 13 is a schematic diagram showing a functional operative relation established by the hardware and software.

Having described the preferred functional techniques, FIGS. 11 to 13 now illustrate a physical apparatus or system for implementing one or more of these techniques. The system may comprise an autonomous device, such as a portable navigation device (PND), an in-vehicle navigation device, a portable map viewer, a device including a positioning system (for example, a satellite based positioning system such as a Global Positioning System (GPS)), a portable digital assistant (PDA), a portable computer, or non-portable computer. Alternatively or additionally, the system may comprise a server storing the digital map, and a remote terminal or computer configured to generate a display of the digital map based on information received from the server over one or more networks, such as an internet or intranet.

FIG. 11 depicts an example embodiment in the form of a PND 100. A PND is chosen as this represents the most challenging design in which design constraints such as confined display size, limited processing power and speed, as well as weight and power supply limitations, are most acute. The PND 100 generally comprises a housing 102 accommodating the PND's electronic hardware, including a display screen 104. The PND is made suitable for in-vehicle use by means of a dock bracket 106. The dock bracket 106 includes a coupling part 108 for releasable or separable docking engagement with a complementary coupling part on the housing 102. The bracket 106 further includes a mounting element 110, such as a suction cup or an adhesive pad, for attaching the bracket 106 to a suitable surface of the vehicle (not shown).

FIG. 12 is an illustrative representation of electronic components 152 of the navigation device 100, in block component format. It should be noted that the block diagram of the navigation device 100 is not inclusive of all components, but is only representative of many example components.

The navigation device 100 includes a processor 210 connected to an input device 220 and the display screen 104. The input device 220 can include a keyboard device, voice input device, touch panel and/or any other known input device utilised to input information; and the display screen 104 can include any type of display screen such as an LCD display, for example. In a particularly preferred arrangement the input device 220 and display screen 104 are integrated into an integrated input and display device, including a touchpad or touchscreen input so that a user need only touch a portion of the display screen 104 to select one of a plurality of display choices or to activate one of a plurality of virtual buttons.

The navigation device may include an output device 260, for example an audible output device (e.g. a loudspeaker). As output device 260 can produce audible information for a user of the navigation device 100, it is should equally be understood that input device 220 can include a microphone and software for receiving input voice commands as well.

In the navigation device 100, processor 210 is operatively connected to and set to receive input information from input device 220 via a connection 225, and operatively connected to at least one of display screen 104 and output device 260, via output connections 245, to output information thereto. Further, the processor 210 is operatively connected to memory 230 via connection 235. The memory 230 can include any suitable media, including non-volatile memory and/or volatile memory, writable and/or read-only memory, semiconductor memory (such as RAM and/or FLASH), magnetic memory, such as a magnetic disc, and optical memory, such as an optical disc. The memory 230 stores various information including executable software, and the digital map 10 discussed above.

The processor 210 is further configured to receive/send information from/to input/output (I/O) ports 270 via connection 275, wherein the I/O port 270 is connectible to an I/O device 280 external to the navigation device 100. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 100 and the internet or any other network for example, and/or to establish a connection to a server via the internet or some other network for example.

FIG. 12 further illustrates an operative connection between the processor 210 and an antenna/receiver 250 via connection 255, wherein the antenna/receiver 250 can be configured for receiving positioning system signals (such as GPS signals or other radio or satellite signals) from which the current real-time position of the navigation device 100 can be determined in a known manner. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 12 are powered by power sources (not shown) in a conventional manner. As will be understood by one of ordinary skill in the art, different configurations of the components shown in FIG. 12 are considered to be within the scope of the present application. For example, the components shown in FIG. 12 may be in communication with one another via wired and/or wireless connections and the like. Also, although the connections are shown as independent of each other, some or all of the connections may share one or more communication buses.

Referring to FIG. 13, the processor 210 and memory 230 cooperate to establish a BIOS (Basic Input/Output System) 150 that functions as an interface between the functional hardware components 152 of the navigation device 100 and the software executed by the device. The processor 210 then loads from memory 230 an operating system 154 which provides an environment in which application software 156 can run.

Depending on the functionality provided by the navigation device 100, the application software 156 may include one or more of: the position determining module 22; the route-calculation module 14; and the map view generation module 16 implementing a two-dimensional plan view in accordance with the techniques previously described herein.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method for generating a display image for a navigation device, wherein the display image includes a map view for display on the navigation device and the map view comprises a two dimensional plan view, the method comprising:
    identifying, using a processor, a plurality of map objects from a digital map for display in a display image on a navigation device, each of the map objects comprising a set of coordinate data points that together define a polygon;
    identifying, using the processor, an outermost boundary defined by at least part of the set of coordinate data points;
    determining, using the processor, that said map object includes one or more non-visible features if said set is determined to include any further coordinate data points within said boundary, non-visible features being features that are not visible to a user at ground level outside of the boundary;
    generating, using the processor, an adapted set of map objects that does not include any of said non-visible features; and
    generating, from said adapted set of map objects, a simplified display image for display on the navigation device, wherein said simplified display image does not include any of said non-visible features, using the processor.

2. A method according to claim 1, wherein each said map object defines a feature of said digital map for display in said display image, said display map includes a plurality of different types of features, and each said map object includes an indication of the type of feature that that map object relates to.

3. A method according to claim 2, wherein at least one of said features is a non-visible feature, and said step of generating an adapted set of map objects comprises the steps of identifying which of said map objects relate to a non-visible feature and selecting map objects other than said identified map objects for inclusion in said adapted set of map objects.

4. A method according to claim 3, wherein said non-visible feature comprises a courtyard.

5. A method according to claim 1, wherein said step of generating an adapted set of map objects comprises, for each said map object that is determined to include one or more non-visible features, the step of discarding all coordinate data points within said boundary to thereby provide an adapted map object for inclusion in said adapted set of map objects.

6. A method according to claim 5, wherein said adapted set of map objects comprises said adapted map objects and any map objects that are determined, in said determining step, not to include any non-visible features.

7. A method according to claim 1, wherein each said map object comprises at least one constituent part that includes a plurality of data points defining a polygon.

8. A method according to claim 7, wherein said determining step comprises determining whether said map object includes a plurality of parts that each includes a plurality of coordinate data points, and identifying any map objects that are determined to have a plurality of constituent parts to be a map object that includes at least one non-visible feature.

9. A method according to claim 8, wherein said step of generating an adapted set of map objects comprises, for each said map object that is determined to include one or more non-visible features, the step of discarding any constituent parts other than a first part that defines an outermost boundary of said map object to thereby provide an adapted map object for inclusion in said adapted set of map objects.

10. A method according to claim 1, wherein each said map object relates to a building in said digital map and defines one or more features of said building.

11. A computer program product, comprising executable software present on a non-transitory computer readable medium which, when executed by a computer processor, implements the method as defined by claim 1.

12. A navigation apparatus comprising a processor configured to generate a display image comprising a two-dimensional plan map view and a display screen configured to display said display image, wherein the processor is further configured to
    identify a plurality of map objects from a digital map for display in the display image, each of the map objects comprising a set of coordinate data points that together define a polygon;
    identify an outermost boundary defined by at least part of the set of coordinate data points;
    determine that said map object includes one or more non-visible features if said set is determined to include any further coordinate data points within said boundary, non-visible features being features that are not visible to a user at ground level outside of the boundary;
    generate an adapted set of map objects that does not include any of said non-visible features; and
    generate, from said adapted set of map objects, a simplified display image to be displayed on the display screen, wherein said simplified display image does not include any of said non-visible features.

13. The navigation apparatus of claim 12, wherein the processor is further configured to infill the determined non-visible features with a graphic associated with said map object.

14. The navigation apparatus of claim 12, wherein the determination of whether said map object includes one or more non-visible features further comprises:
    acquiring coordinate data points that define said map object when said map object is included within a map view;
    analysing the acquired coordinate data points for said map object to determine whether said map objects includes one or more non-visible features; and
    flagging said map objects for further processing when said map object includes one or more non-visible features.

15. The navigation apparatus of claim 12, wherein the processor is further configured to:
    calculate a route; and
    superpose said route onto said simplified display image.

* * * * *